Figure 1:
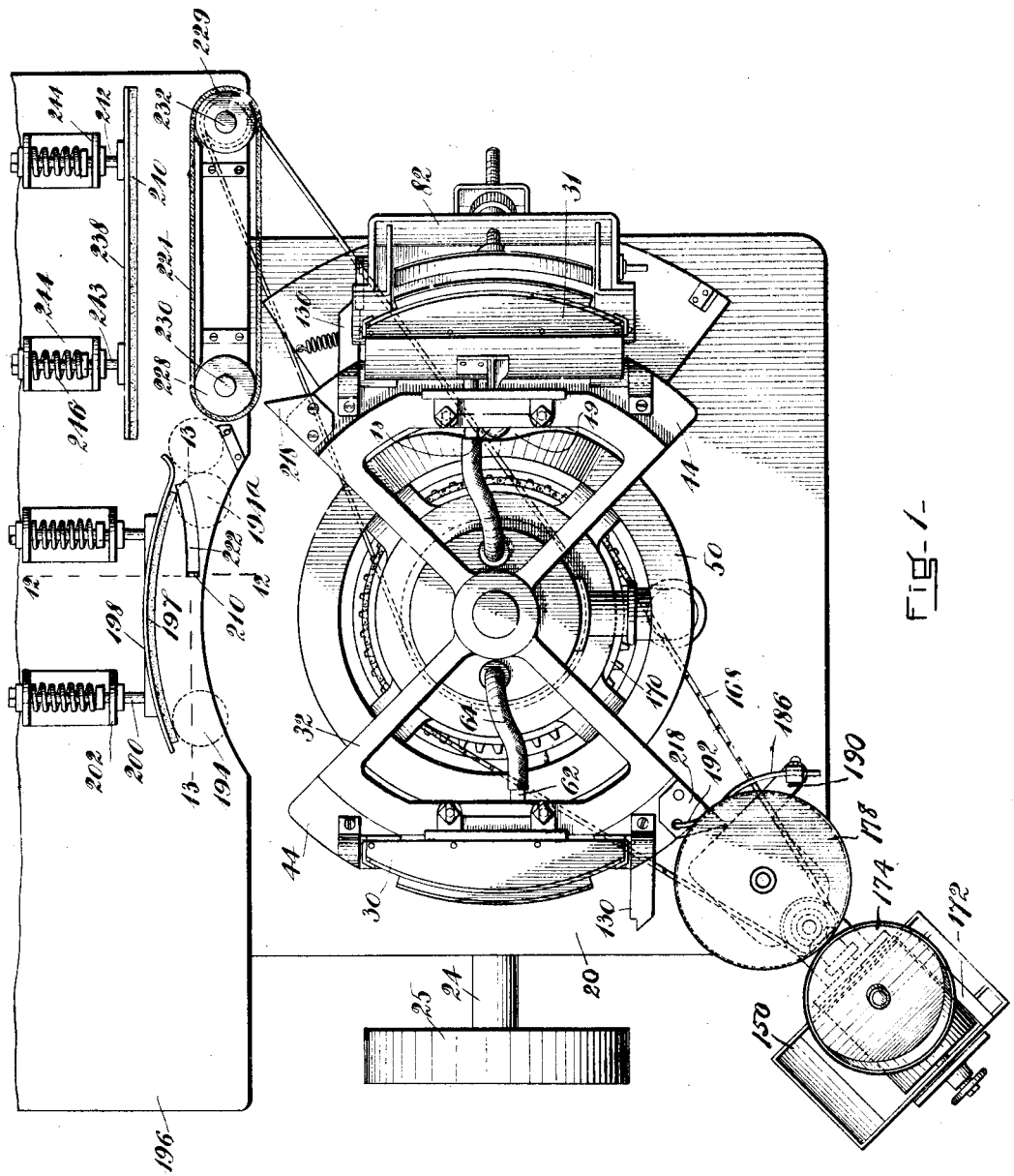

F. DODGE.
LABELING MACHINE.
APPLICATION FILED FEB. 25, 1913.

1,078,723.

Patented Nov. 18, 1913.
3 SHEETS—SHEET 1.

WITNESSES:
John Buckler
Frederic P. Sawyer

INVENTOR:
Frank Dodge

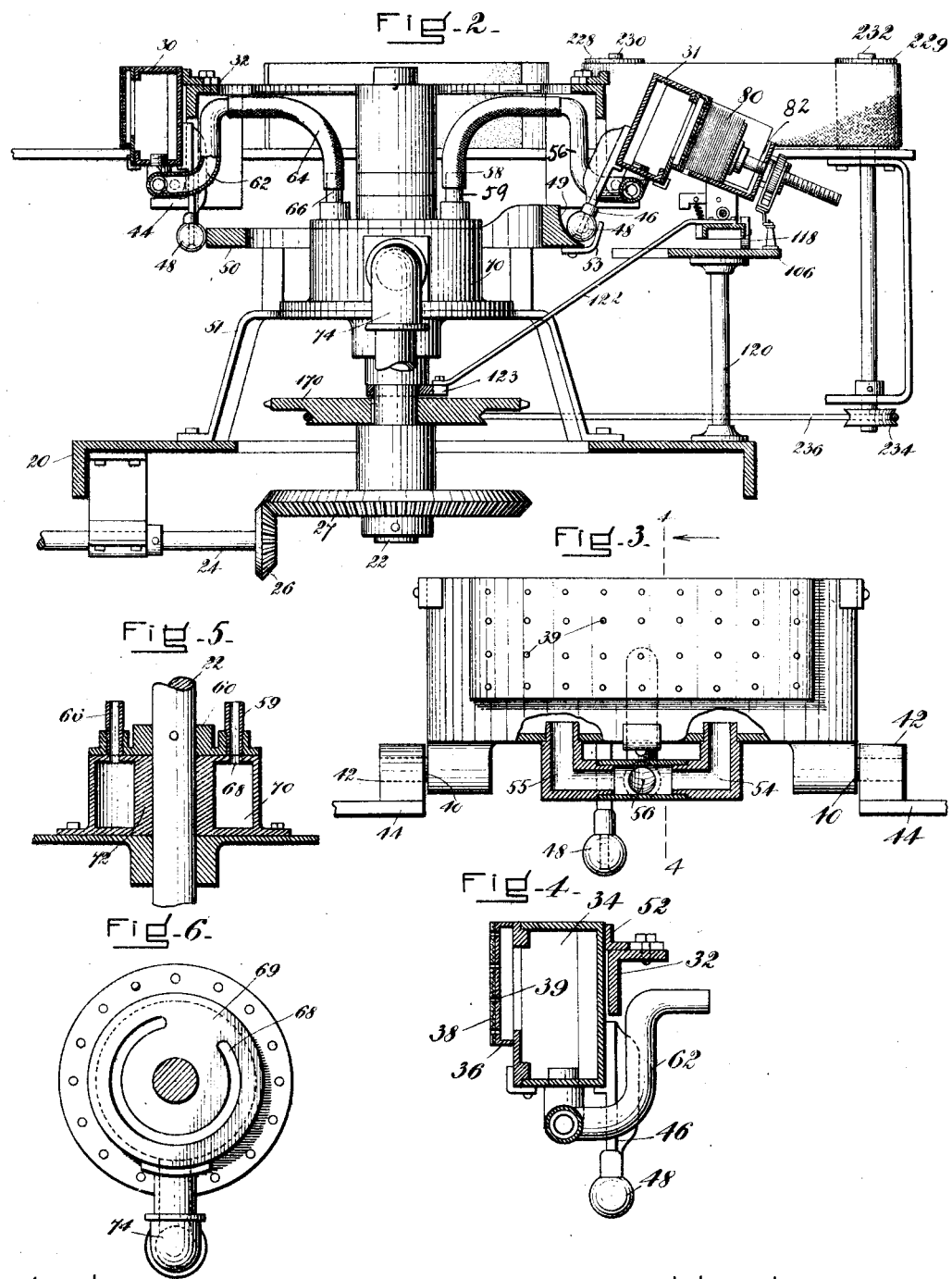

F. DODGE.
LABELING MACHINE.
APPLICATION FILED FEB. 25, 1913.
1,078,723.
Patented Nov. 18, 1913.
3 SHEETS—SHEET 3.
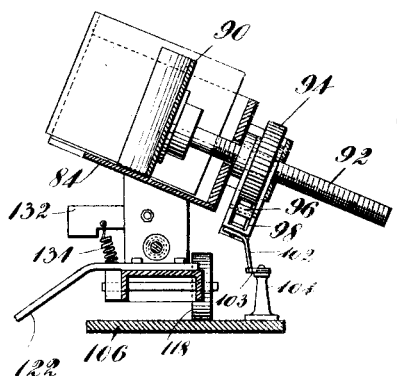
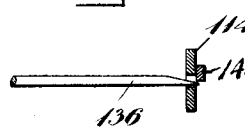
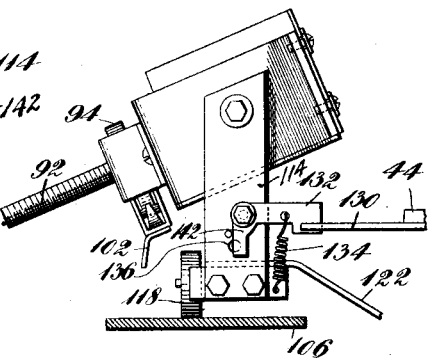
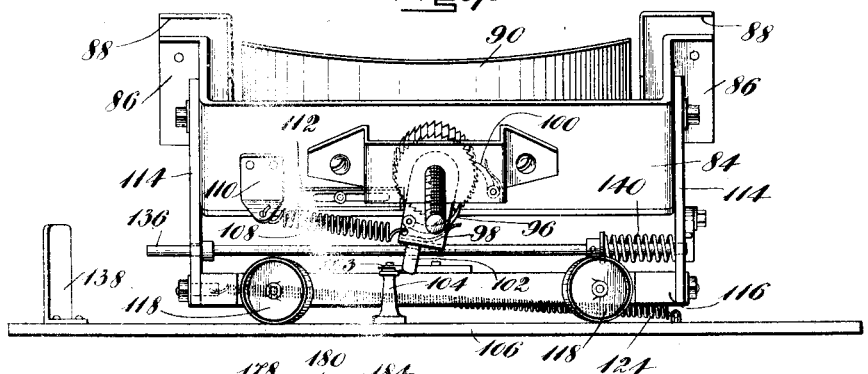
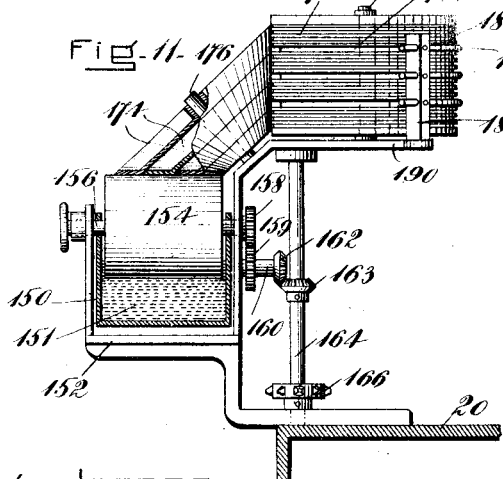
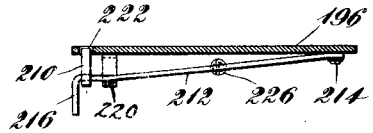
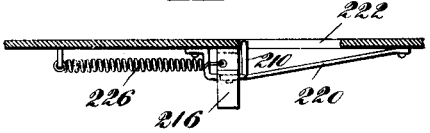
WITNESSES:
John Buckler
Frederic R. Sawyer
INVENTOR:
Frank Dodge

UNITED STATES PATENT OFFICE.

FRANK DODGE, OF BOSTON, MASSACHUSETTS, ASSIGNOR TO FREDERIC R. SAWYER, OF MALDEN, MASSACHUSETTS, AND ARTHUR E. COFFIN, OF NEWTON, MASSACHUSETTS.

LABELING-MACHINE.

1,078,723.

Specification of Letters Patent.

Patented Nov. 18, 1913.

Application filed February 25, 1913. Serial No. 750,557.

*To all whom it may concern:*

Be it known that I, FRANK DODGE, of Boston, in the county of Suffolk and State of Massachusetts, have invented certain new and useful Improvements in Labeling-Machines, of which the following is a specification.

This invention relates to a machine for affixing labels to bottles, cans, and other articles.

The object of the invention is to provide a machine that is simple in construction, and rapid and efficient in operation.

The invention will be clearly understood from an inspection of the accompanying drawings, in which—

Figure 1 is a plan view of an illustrative embodiment of the invention, Fig. 2 is a central, longitudinal, vertical section of the same, Fig. 3 is a front elevation, partly in section, of a label-carrier, Fig. 4 is a vertical section taken on the line 4—4 in Fig. 3, Fig. 5 is a central vertical section of the vacuum chamber, Fig. 6 is a plan view of the same with the top plate removed, Fig. 7 is a front elevation of a label-holder, Fig. 8 is a transverse vertical section of the label-holder, as viewed from the left-hand end of Fig. 7, Fig. 9 is a right-hand end elevation of the label-holder, Fig. 10 is a sectional detail view of the tripping mechanism for releasing the label-holder, Fig. 11 is a sectional side elevation of the paste-applying mechanism, Fig. 12 is a horizontal section taken on the line 12—12 in Fig. 1, and Fig. 13 is a similar view taken on the line 13—13 in Fig. 1.

As illustrated in the drawings, the machine comprises a table 20, which may be supported in any suitable manner, and a vertical or main shaft 22, which is journaled in suitable bearings. Motion is imparted to the main shaft by a driving shaft 24, which may be driven by a belt running over a pulley 25, or by any other suitable source of power, the shaft 24 being provided with a bevel pinion 26 which meshes with a bevel gear 27 on the main shaft.

Mounted to rotate with the main shaft 22 are a plurality of label-carriers or conveyers 30, 31. Only two such conveyers are shown, but it will be understood that any desired number may be employed. The label-conveyers are carried by a support shown in the form of a frame 32, which is affixed to the main shaft 22. These conveyers are alike in construction, so that a description of one will suffice for both. The conveyer 31 comprises a hollow casing 34, having an arcuate wall 36, which is concentric with the main shaft 22 and is faced with rubber 38, or any other suitable material, and the wall 36 and the facing 38 are provided with registering perforations 39. The casing 34 is provided on its under side with trunnions 40, which are pivotally mounted in lugs 42 supported on flanges 44 depending from the frame 32. A bracket 46 depends from the inner side of the casing 34 and is provided at its lower end with a spherical cam-roll 48, which is adapted to engage a stationary cam-ring 50, suitably supported upon a spider 51, mounted upon the table 20. The cam-ring 50 controls the tilting movements of the label-conveyers, as will be hereinafter explained. A guide-cam 53 is provided adjacent to the cam-ring 50 to guide the cam-roll 48 into a depression 49 to cause the label-conveyer to be tilted. When the label-conveyers are in upright position they engage stops 52 mounted upon the frame 32. The interior of the label-conveyer 31 communicates with a pair of branch pipes 54, 55, of a pipe 56, the latter being connected by a flexible hose pipe 58 to a nipple 59 affixed to a disk 60, which is pinned to the main shaft 22 and acts as a valve plate. The interior of the label-conveyer 30 communicates with a pipe 62, which is connected by a flexible hose pipe 64 to a nipple 66 in the disk 60. The nipples 59 and 66 are adapted to register with an arcuate slot 68 formed in the top plate 69 of a vacuum chamber 70, said chamber being mounted upon the spider 51 and having a central hub 72, which forms a bearing for the main shaft 22. The vacuum chamber 70 communicates with a pipe 74 leading to any suitable exhauster or air pump.

The labels which are to be affixed to cans, bottles, or other forms of containers, are supported on their edges in a pack 80, in a slightly inclined position by a label-holder 82. The label-holder comprises a box-like member 84, open at the top and inner side, and provided with a pair of wings 86, to which guides 88 are adjustably secured. These guides are adjustable to accommodate labels of various lengths. The labels are fed forward to a position from which they may be taken by the label-conveyers, by a pusher comprising an arcuate plate 90, which is concentric with the main shaft 22 and is slidable over the bottom of the label box 84. The plate 90 is affixed to the inner end of a feed-screw 92, which extends through the outer wall of the label box and is threaded through a feed-nut 94, having ratchet teeth on its periphery. The ratchet teeth coöperate with a feed-pawl 96 carried by a yoke 98 rotatable on the feed-screw 92, and also with a locking-pawl 100, which prevents backward rotation of the feed nut. A finger 102 depends from the yoke 98 in a position to engage a yielding stop 103, carried by a post 104 on a shelf 106, whereby a feeding movement is imparted to the pawl 96 when the label holder is moved forward, as will be hereinafter explained. A retractile spring 108 is affixed at one end to the yoke 98, and at its other end to a bracket 110 on the label box 84. This spring returns the yoke and pawl after the feeding movement, said return movement being limited by an adjustable stop 112. This stop determines the extent to which the feeding nut 94 is turned at each feeding movement of said nut. The label box is mounted upon a carriage having upwardly extending sides 114, and a bottom 116. A pair of rollers 118 are rotatably mounted on the bottom 116 of the carriage, and travel over the shelf 106, which is supported by posts 120, mounted on the table 20. The carriage is braced by a strut 122, which is affixed at one end of the carriage bottom 116, and at its other end to a collar 123 loosely surrounding the shaft 22. A retractile spring 124 is attached at one end to the carriage bottom 116, and at the other end to the shelf 106.

With the parts in the position shown in Figs. 1 and 2, the interior of the conveyer 31 is in communication with the vacuum chamber 70, and a label is drawn from the stack 80 against the perforated facing sheet 38 of said conveyer. At this time the cam roller 48 has entered the depression 49 in the cam ring 50, causing the label conveyer to tilt so that its arcuate face is inclined to correspond with the inclination of the stack of labels 80. A projection 130 on the flange 44 is in engagement with a detent 132 pivoted upon an upright 114. The detent 132 is normally held in the position shown in Fig. 9 by a retractile spring 134.

The label-conveyer 31 and the label-holder or box travel together until one end of a rod 136 engages a stop 138, which projects upwardly from the shelf 106. The rod 136 is slidably mounted in the uprights or sides 114, and is normally held in retracted position by a spring 140. The other end of the rod 136 is beveled, as shown in Fig. 10, and is adapted to engage the depending arm 142 of the detent 132. When the rod 136 engages the stop 138, the wedge-shaped end of said rod engages the arm 142 to raise the detent 132 out of engagement with the projection 130. At this time the cam-roll 48 has passed out of the depression 49 into engagement with the circular periphery of the cam ring 50, the label-conveyer being thereby swung into vertical position, and the label-box 82, being freed from the projection 130, is swung back to normal position by the spring 124. At the end of the forward movement of the label-holder the feed nut 94 is given a partial turn, by the engagement of the members 102 and 103, to feed forward the stack of labels. The label held by the label-conveyer is then moved to the adhesive-applying position. The mechanism for applying the adhesive to the label will next be described. It comprises a tank 150, filled with paste 151, and mounted upon a bracket 152, which is secured to the table 20. A paste-roll 154 is partly immersed in the paste 151, and is mounted upon a shaft 156, journaled in suitable bearings, said shaft being provided with a gear 158 which meshes with a gear 159 on a stud shaft 160. The shaft 160 has a bevel gear 162, which meshes with a bevel gear 163 on a vertical shaft 164, said vertical shaft having a sprocket wheel 166 over which a sprocket chain 168 passes. The chain 168 is driven by a sprocket wheel 170 on the main shaft 22. A plate 172 is adjustably mounted on the tank 150 and is adapted to regulate the amount of the paste taken up by the paste-roll 154. The paste-roll 154 is in peripheral contact with a series of conical paste-transferring rolls 174, mounted on a shaft 176, whereby the paste is transferred from the roll 154 to a paste-applying roll 178, with which the conical transferring rolls are also in peripheral contact. The paste-applying roll 178 is mounted upon a stud shaft 180 and is adapted to apply the paste to the label as it is carried by on the label-conveyer. The periphery of the roll 178 is formed with shallow grooves or corrugations 182, and a plurality of deeper grooves 184. The grooves 184 are adapted to receive wire fingers 186, which project laterally from a post 188 mounted on a bracket 190. The fingers 186 are so shaped that they lie within the grooves 184 at the point of tangency between the paste-applying roll and the label as the latter moves along with the label-conveyer. Beyond this point of tangency the fingers 186 are bent so that their ends 192 project beyond the periphery of the paste-applying roll. These ends are adapted to engage the label to prevent it from following around the periphery of the paste-applying roll, and said fingers guide the label so that it will remain on the conveyer. The paste-coated label is then moved by the conveyer into engagement with a container 194 resting upon a platform 196. The container, to which the label is to be affixed, engages a yielding facing 197 on an arcuate plate 198, which plate is mounted upon a pair of spring-pressed rods 200 slidably mounted in brackets 202. When the label-conveyer engages the container 194, the latter is given a rolling motion along the padded plate 198, and the label is wrapped about the container, the facing 197 on the plate 198 and the facing 38 on the label-conveyer imparting a yielding pressure to the label to apply the latter smoothly to the periphery of the container. When the label arrives at the container 194, communication is shut off between the label-conveyer and the vacuum chamber 70, by the nipple 59 passing from a position over the slot 68 to the solid portion of the plate 69 extending between the ends of said slot, see Figs. 5 and 6. Thus the suction is removed from the label and it will adhere to the container as they move along together. After the label is affixed to the container, the latter is left in the position indicated by 194ª, and then the conveyer passes along to the label-holder or box 82, where another label is drawn from the stack 80 by the suction in the conveyer, it being understood that the pipe communicating with the conveyer casing is now again in communication with the vacuum chamber through the slot 68.

In order to move the containers away after they have been labeled, I provide a dog 210, carried by a lever 212 fulcrumed at 214 on the under side of the platform 196. The lever 212 is provided with a depending finger 216, which is adapted to be engaged by a beveled projection or cam-finger 218 carried by the flange 44. When the finger 216 is engaged by a cam-finger 218, the lever 212 is pushed along an inclined strap 220, mounted on the under side of the platform 196, and the dog 210 is projected through a slot 222, in said platform, and caused to engage the container 194ª to move it and those ahead toward the right into a position where they will be brought into engagement with a movable wiper in the form of a belt 224. When the finger 216 is disengaged from the cam-finger 218, the lever 212 is returned to normal position by a spring 226.

The wiper 224 may be of any suitable construction, and as here shown comprises an endless belt traveling over pulleys 228 and 229, on shafts 230 and 232, respectively. The shaft 232 is provided with a grooved pulley 234 over which a belt 236 passes to a grooved pulley formed on the sprocket wheel 170. Coöperating with the wiper belt 224, is a stationary wiper, comprising a plate 238 having a yielding facing 240 and affixed to rods 242, which are slidably held in brackets 244 mounted on the platform 196. The rods 242 are surrounded by springs 246, by which the plate 238 is yieldingly pressed against the containers so that they will be fed forward by the belt 224, and the stationary and movable wipers coöperate to wipe the labels so that their ends will be pasted down tightly and smoothly on the container.

What I claim is:—

1. In a labeling machine, the combination of a label-holder adapted to hold a stack of labels, a label-conveyer adapted to remove the labels one at a time from said holder, means for applying paste to said label, a support for the article to be labeled, means for engaging the article and coöperating with said conveyer to enable the latter to affix the label to the article, means for wiping the labels after they are affixed, and an oscillatory member projecting through said support for engaging the articles and feeding them to the wiping means.

2. In a labeling machine, the combination of a label-holder arranged for oscillatory motion, a normally vertical label-conveyer arranged to be tilted into operative relation with said holder and movable therewith to remove a label therefrom, means comprising a spring for returning said conveyer to normal position, means for applying paste to the label, and means coöperating with said conveyer whereby the label is affixed to an article.

3. In a labeling machine, the combination of a label-holder arranged for oscillatory motion, a plurality of label-conveyers arranged to be swung one at a time into operative relation with said holder to remove a label therefrom, means for causing the conveyer and holder to travel together while the label is being removed, means for swinging the conveyer into upright position, means for returning the holder to normal position, means for applying paste to said label, and means coöperating with said conveyer to enable the latter to apply the label to an article.

4. In a labeling machine, the combination of a pivotally mounted dog adapted to engage a container, means for raising the dog, and means comprising a cam for moving said dog laterally to move the container along.

5. In a labeling machine, the combination of a platform upon which a container may rest, said platform being provided with a slot, a lever provided with a dog adapted to be projected through said slot, and an inclined surface adapted to be engaged by said lever, whereby when said lever is turned in one direction said dog is projected through said slot in a position to engage a container and move it over said platform.

6. In a labeling machine, the combination of means for holding a stack of labels, means for removing the labels from the stack one at a time, means for applying paste to said labels, means for supporting a container in position to have a label applied thereto, means for wiping said label after it has been applied and affixed to said container, and a dog projecting through said supporting means intermittently for feeding the container forward.

7. In a labeling machine, the combination of a platform for supporting a plurality of containers, means projecting through the platform for moving the containers over said platform, a movable wiper comprising an endless belt, and a stationary wiper adapted to coöperate with said movable wiper to wipe the ends of the labels which have been applied to the containers.

8. In a labeling machine, the combination of a label-holder adapted to hold a stack of labels, a label-conveyer adapted to remove said labels one at a time from said holder, means for applying paste to the label on the conveyer, means for preventing the label from leaving the conveyer during the paste-applying operation, said conveyer being arranged to affix the label to a container, means for feeding forward the container after the label is affixed thereto, and means independent of the affixing means for wiping said label, after it is affixed thereto.

In testimony whereof I have affixed my signature, in presence of two witnesses.

FRANK DODGE.

Witnesses:
   CHAS. F. HOWE,
   GEORGE CLARENDON HODGES.